May 1, 1923.
D. YENSEN
1,453,899
METHOD OF SECURING CALKS TO HORSESHOES
Filed Feb. 26, 1920
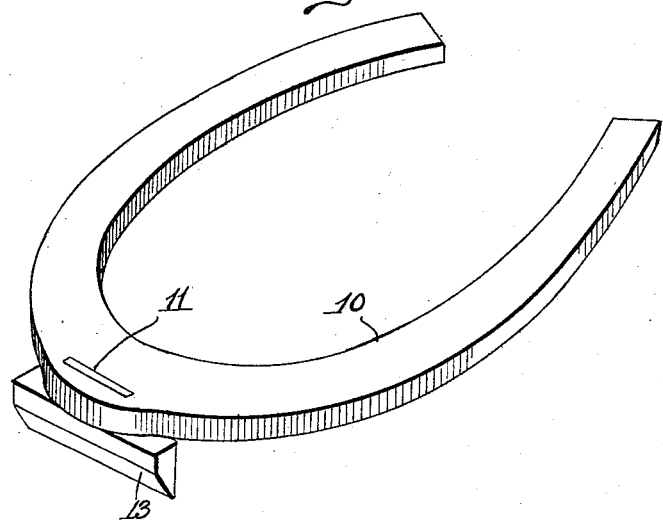
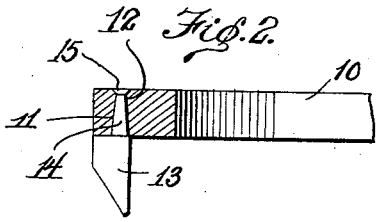
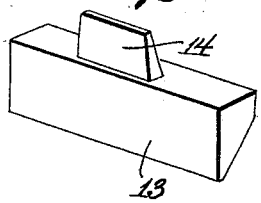
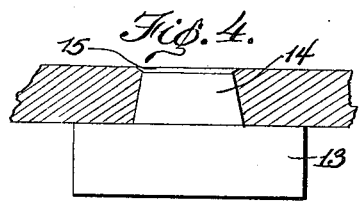
Inventor
Douglas Yensen
By J. Reaney Kelly
Attorney Patented May 1, 1923.

1,453,899

UNITED STATES PATENT OFFICE.

DOUGLAS YENSEN, OF ROSEBERRY, IDAHO.

METHOD OF SECURING CALKS TO HORSESHOES.

Application filed February 26, 1920. Serial No. 361,538.

*To all whom it may concern:*

Be it known that DOUGLAS YENSEN, citizen of the United States, residing at Roseberry, in the county of Valley and State of Idaho, has invented certain new and useful Improvements in Methods of Securing Calks to Horseshoes, of which the following is a specification.

The present invention relates to an improved method of attaching calks to horseshoes and to provide an improved means whereby the independent heating of the shoe and calk will be eliminated to the end that the operation can be quickly and efficiently accomplished securing cooperation.

Heretofore in securing calks to horseshoes, it has been necessary to first heat the shoe. After the shoe has been heated the calk is heated and the welding operation accomplished. To eliminate the two independent heating operations, I contemplate providing a method by which both the shoe and calk can be heated at the same time, an extension of the calk being placed in a slot in the shoe and the welding operation performed.

Fig. 1 is a view in perspective showing a horseshoe with the calk attached.

Figure 2 is a view in cross section of a horseshoe showing the calk in place after the welding operation.

Figure 3 is a view in perspective of the calk.

Fig. 4 is a view in rear elevation of the calk and a view in cross section of the shoe showing the same after the welding operation.

In illustrating my improved method, I have shown in the drawings a shoe 10 of conventional type being provided near the toe with an elongated opening 11 for the reception of a portion of the calk. The mouth of the opening is flared as shown at 12 for the purposes that will presently appear.

The calk 13 is provided with a tenon 14 which is substantially wedge-shaped in cross-section and which is designed to fit the opening 11 of the shoe.

In securing the calk to the shoe the tenon 14 is first placed in the opening 11 of the shoe, after which the shoe and calk are welded simultaneously and the tenon welded in place, its principal end being beaded as at 15 to fit the flared mouth of the opening 11.

The flared end 12, it is to be noted, provides a pocket or seat for the head or bead of the pinion and serves to give shape or form to the bead as it is pounded out. The purpose of the pocket is to cause the calk to become firmly wedged to the shoe and to prevent the same from becoming loosened when subjected to continual pounding on a hard surface. This is accomplished by reason of the fact that the tenon is wedge shaped or tapered to prevent movement through the slot in one direction while the head or bead at the end of the pinion prevents movement through the slot in the opposite direction. Consequently, after the welding operation, a more durable and lasting structure is obtained than where the welding alone is depended upon for holding the calk properly.

What is claimed is:—

The method of securing a toe calk to a horseshoe which consists in forming the shoe with an elongated wedge-shaped slot and flaring the mouth of the slot at the narrow end to provide a bead pocket, forming the calk with a wedge-shaped tenon to fit through the slot, heating the shoe and calk simultaneously, and welding the tenon in place by beading it on the end to provide a head filling the flared mouth or pocket of the slot and locking the calk to the shoe.

In testimony whereof I affix my signature.

DOUGLAS YENSEN.